(12) United States Patent
Lee et al.

(10) Patent No.: US 7,515,923 B2
(45) Date of Patent: Apr. 7, 2009

(54) METHOD OF PERFORMING POWER CONTROL IN A MOBILE COMMUNICATION SYSTEM

(75) Inventors: Young Jo Lee, Kunpo-shi (KR); Chang Woo Hong, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 420 days.

(21) Appl. No.: 10/329,457

(22) Filed: Dec. 27, 2002

(65) Prior Publication Data
US 2003/0125068 A1    Jul. 3, 2003

(30) Foreign Application Priority Data
Dec. 28, 2001    (KR)    ...................... 10-2001-0087170

(51) Int. Cl.
*H04B 7/00*    (2006.01)
*H04Q 7/20*    (2006.01)

(52) U.S. Cl. .................... 455/522; 455/13.4; 455/67.11

(58) Field of Classification Search ................ 455/522, 455/69, 67.11, 126, 13.4, 517, 13.1, 67.1, 455/226.1, 226.3; 370/318
See application file for complete search history.

(56) References Cited

U.S. PATENT DOCUMENTS 5,566,363 A * 10/1996 Senda ........................ 455/126
5,805,585 A * 9/1998 Javitt et al. .................. 370/342
5,946,346 A    8/1999 Ahmed et al.
6,088,335 A * 7/2000 I et al. ........................ 370/252
6,118,983 A * 9/2000 Egusa et al. ................... 455/69
6,151,508 A * 11/2000 Kim et al. .................... 455/522
6,188,678 B1 * 2/2001 Prescott ...................... 370/318
6,366,572 B1 * 4/2002 Esterberg et al. ............. 370/343
6,374,085 B1 * 4/2002 Saints et al. ................... 455/69
6,400,960 B1 * 6/2002 Dominique et al. .......... 455/522
6,594,500 B2 * 7/2003 Bender et al. ............... 455/522
6,754,506 B2 * 6/2004 Chang et al. ................ 455/522
6,904,291 B2 * 6/2005 Miyamoto et al. .......... 455/522
6,950,670 B2 * 9/2005 Chang et al. ................ 455/522
2004/0152422 A1 * 8/2004 Hoglund et al. .......... 455/67.11

OTHER PUBLICATIONS

Korean Office Action dated Nov. 11, 2007.

* cited by examiner

*Primary Examiner*—Nay A Maung
*Assistant Examiner*—Tuan H Nguyen
(74) *Attorney, Agent, or Firm*—KED & Associates, LLP

(57) ABSTRACT

A method of performing power control in a mobile communication system is disclosed. In the method, power control information is transmitted to a terminal by using a terminal power control threshold of the terminal being changed in due consideration of a communication circumstance in case of that a high-speed data transmission terminal is scheduled during receiving low-speed and voice data from the terminal.

20 Claims, 1 Drawing Sheet

METHOD OF PERFORMING POWER CONTROL IN A MOBILE COMMUNICATION SYSTEM

This application claims the benefit of Korean Application No. P2001-87170 filed on Dec. 28, 2001, which is hereby incorporated by reference as if fully set forth herein.

BACKGROUND OF THE INVENTION

1. Field of the Invention

The present invention relates to a mobile communication system, and more particularly, to a method of performing power control in a mobile communication system.

2. Background of the Related Art

Typically, when reverse link data frames are transmitted at a variable data rate, there are two methods for determining a data rate and transmitting the data frames at the determined data rate as follows.

First, the data rate is determined by a terminal. In other words, the terminal starts transmission of a data frame at a minimum data rate. Then, the terminal checks its own communication condition and determines to increase/decrease or maintain the data rate in accordance with communication condition.

Second, there is a second method of determining the data rate of the terminal by scheduling of the base station. That is, the data rate of the terminal is determined according to a strength of a received pilot signal, an available transmission power of a corresponding terminal, and a strength of total received signal power by the base station.

When the data rate is determined by scheduling of the base station, a short frame is used to transmit the data frame at the determined data rate. Therefore, in case that the base station schedules a plurality of data transmissions such that a terminal may transmit a high rate data frame, the high data rate may be increased to a maximum data rate acceptable within a predetermined noise rise limit. Accordingly, the terminal may obtain a great amount of data throughput. As the terminal having the high rate data transmits the data at a high power, low rate data and/or voice data transmission of other terminals in the same sector may be interfered by the high rate data transmission. Therefore, a frame error rate of the low rate data and/or voice data may be significantly increased. The base station may schedule a rate of the high rate data in accordance with the noise signal level and/or interference signal level so that the low rate data/or voice data may not have a significant frame error rate. However, even so the interference may instantaneously increase when a new terminal in the sector including a few terminals being transmitting the low rate data and/or voice data connects with the base station, and requires high rate data service, the base station may accept the high rate data service. If the terminals transmitting the low rate data and/or voice data do not properly reflect changes of the interference raised by transmission of the high rate data, a significant frame error in transmitting the low rate data and/or voice data may be generated.

SUMMARY OF THE INVENTION

An object of the present invention is directed to a method of performing power control in a communication system the same that substantially obviates one or more problems due to limitations and disadvantages of the prior art.

Another object of the present invention is to provide performing power control in a communication system enabling to decrease frame errors of voice data and/or low rate data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing power control in communication system, comprises the steps of adjusting a predetermined power control threshold value for a first terminal based on communication environment of a second terminal for higher rate data than predetermined rate data, and transmitting a power control command based on the adjusted-predetermined power control threshold value to the first terminal for low rate data and/or voice data.

Preferably, the communication environment condition is at least one of an interference degree raised by the first terminal, an available transmission power of the second terminal, and a condition of a reverse link.

Preferably, the threshold value is a ratio of a received signal power to a noise signal power.

According to another aspect of the present invention, a method for performing power control in communication system, comprises the steps of adjusting a predetermined power control threshold value for a first terminal according to a frame quality value of a received frame, re-adjusting the adjusted-predetermined power control threshold value for the first terminal based on a communication environment condition of a second terminal for requiring higher rate data than predetermined rate data, and transmitting a power control command based on the re-adjusted-predetermined power control threshold value to the second terminal.

Preferably, the adjusted-predetermined power control threshold value varies according to a predetermined frame error rate.

According to still another aspect of the present invention, a method for performing power control in communication system, comprises the steps of comparing a group quality value of at least one power control group of a frame received from a first terminal for requiring lower rate data than a predetermined rate data with a predetermined group quality value, transmitting the second power control command according to the comparing result, adjusting a predetermined power control threshold value according to a frame quality value of the received frame, re-adjusting the adjusted-predetermined power control threshold value based on a communication environment condition of a second terminal for requiring a higher rate data than the predetermined rate data, and transmitting a second power control command based on the re-adjusted-predetermined power control threshold value to the first terminal.

Preferably, the adjusted power control threshold value varies according to a predetermined frame error rate.

Preferably, the power control commands are increased/decreased/maintained at a predetermined amount.

According to still another aspect of the present invention, a mobile communication system, comprises a base station for generating a power control command based on a power control threshold value for a first terminal adjusted according to a communication environment condition of a second terminal for requiring a high rate date than a predetermined rate data, and the first terminal transmitting a corresponding data based on the power control command to the base station after a predetermined time.

According to still another aspect of the present invention, a method for performing power control in communication system, comprises the steps of scheduling terminals according to the terminals' data rates, transmitting, to a first terminal for requiring a lower rate data than a predetermined rate data, a first power control command based on a first power control threshold value adjusted according to a frame quality value of a frame received from the first terminal, and transmitting, to a second terminal having a higher rate data than the predetermined rate data, a second power control command based on a second value adjusted according to a communication environment of the second terminal and at least one of a predetermined power control threshold value and the first power control threshold value.

According to still another aspect of the present invention, a method for performing power control in communication system, comprises the steps of transmitting power control information to a first terminal by using terminal power control threshold of the first terminal being changed in due consideration of a communication circumstance in case of that a second terminal for requiring high-speed data transmission is scheduled during receiving low-speed and voice data.

Preferably, the threshold is changed after at least one frame in due consideration of a communication circumstance of the second terminal, when transmitting low-speed or voice signal to the terminal in a frame unit.

Preferably, the communication circumstance is determined by an interference signal level of the second terminal and a location and a transmittable power a channel state of the first terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
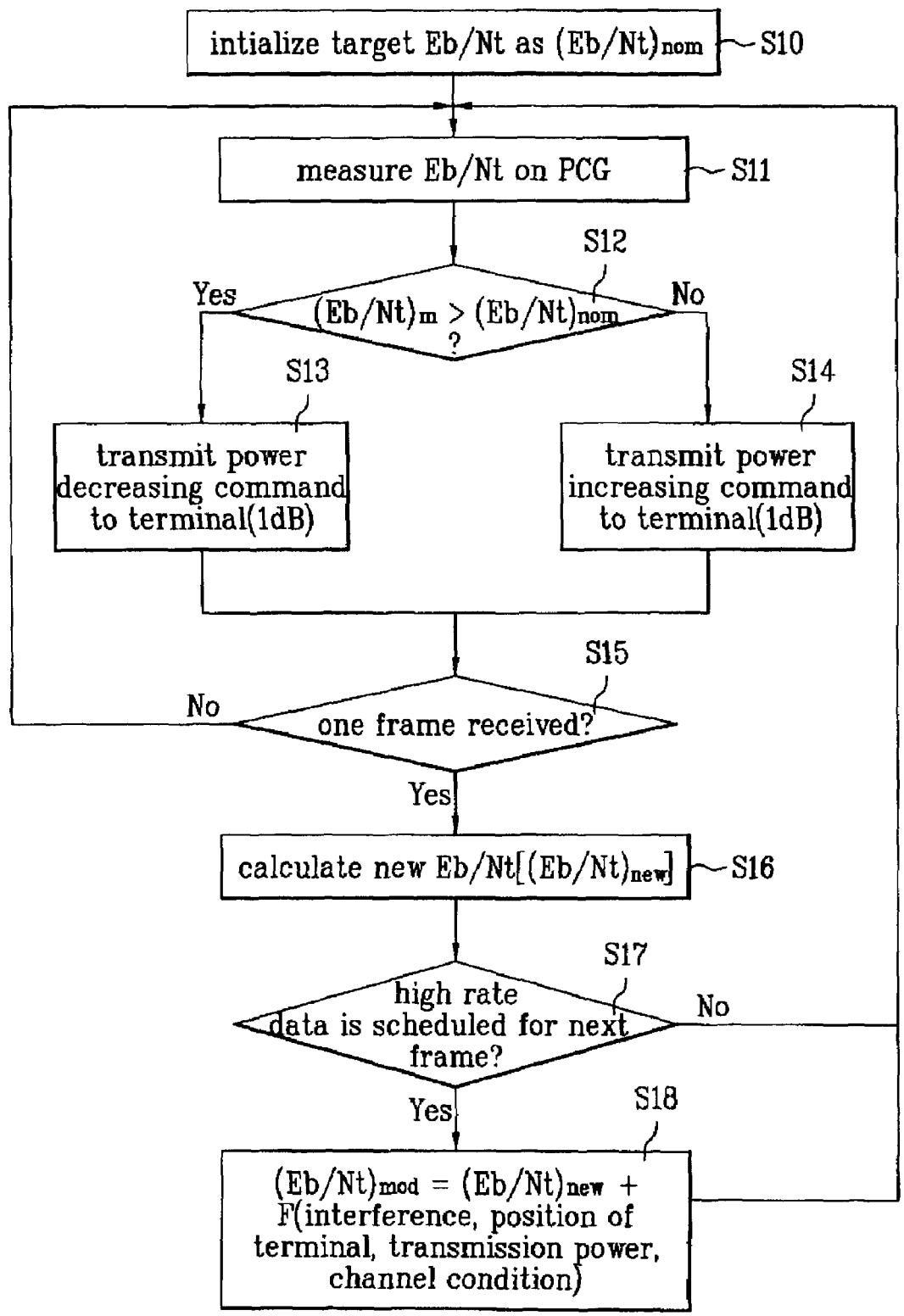
FIG. 1 is a flow chart illustrating power control steps according to a preferred embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

With regard to a data transmission on a reverse link based on a scheduling method of a base station, when high rate data is transmitted, an outer-loop power control method of adjusting a target Eb/Nt (a receiving signal power/total noise signal power) is used. In the outer-loop power control method, a method for decreasing an error rate of a frame of low rate data and/or voice data transmission terminal due to an interference generated by transmitting high rate data is proposed. In this case, it is assumed that a terminal may simultaneously transmit high rate, low rate and voice data.

A communication environment of a terminal is divided into following two cases.

First, is a case in which the communication environment of receiving and/or transmitting the signals may be poor at low rate data and/or voice data to/from a base station. At this time, a terminal has a transmission signal with a high power level already assigned by a power control of the base station, and the high power level may approach an upper power level limit. Even though the base station increases the target Eb/Nt before one frame, frame errors may occur in frames from the terminal to the base station due to the upper power level limit of the terminal. In other words, there are problems in an algorithm of scheduling data rates of the base station.

Second, is a case in which the communication environment is good at low rate data and/or voice data to/from a base station. It means that a terminal has enough available power to transmit the low rate data and/or voice data. That is, the terminal transmits the low rate data and/or voice data at a low power, so that the terminal has enough power. Accordingly, the base station increases the target Eb/Nt for adjusting a power of a corresponding terminal before at least one frame so as to prepare interference increase raised by a transmission of the high rate data, thereby preventing frame errors from being generated.

When the base station schedules the high rate data, the target Eb/Nt for the low rate and/or voice data is increased by the base station before at least one frame so as to assign the power in advance, so that it is possible to decrease frame errors of low rate data and/or voice data frame.

FIG. 1 is a flow chart illustrating power control steps according to a preferred embodiment of the present invention.

Referring to FIG. 1, the target Eb/Nt is initialized to a (Eb/Nt)nom value, an appropriate value (average value), when a system initially drives. (S10)

Then, the Eb/Nt value is measured during a power control group (hereinafter, referred as to "PCG") of a frame being received from a predetermined terminal. (S11) The measured Eb/Nt value is indicated to (Eb/Nt)m. At this time, it is assumed that the received frame is low rate data and/or voice data.

Subsequently, it is determined whether the measured (Eb/Nt)m is greater than the target (Eb/Nt)nom (S12). If the (Eb/Nt)m is greater than the target Eb/Ntnom, a power control command for decreasing the power is transmitted to the corresponding terminal. (S13). Meanwhile, if the (Eb/Nt)m is less than the target (Eb/Nt)nom, a power control command for increasing the power is transmitted to the corresponding terminal. (S14) Accordingly, the terminal adjusts the transmission power of frames to transmit on a reverse link based on decreasing or increasing power control command. At this time, the adjusted power is increased or decreased by 1 dB unit.

After transmitting the power control command for increasing or decreasing the power, the base station checks whether receiving a frame is fully received. (S15) If the frame is not fully received, the aforementioned process steps S11 to S14 are repeatedly performed.

After completing the power control of the frame by repeating the aforementioned process steps, the base station adjusts the target (Eb/Nt)nom as (Eb/Nt)new in accordance with frame error rate of a frame received from the terminal for the next frame. (S16) At this time, the target (Eb/Nt)new is determined by a preset frame error rate. Then, the aforementioned process steps S11 to S15 are repeatedly performed with the adjusted target, (Eb/Nt)new.

The base station checks whether the high rate data is scheduled or not. (S17) If the base station schedules data rates such that a terminal having high rate data transmits data, the base station obtains (Eb/Nt)mod for applying at least one of an interference level by the scheduled terminal, a location of the scheduled terminal for the high-rate data, an available transmission power of the scheduled terminal for the high rate data and a condition of the scheduled terminal on a reverse link to the (Eb/Nt)new (S18) thereby sets the (Eb/Nt)new as (Eb/Nt) mod. At this time, the newly set value of the target (Eb/Nt) mod is set such that a greater transmission power is allocated for the low rate data and/or voice data with a frame error rate reduced.

In S17 step, if the high rate data is not scheduled, and the low rate data and/or voice data is scheduled, the outer-loop power control is performed by the newly set target Eb/Nt value, (Eb/Nt)new.

A terminal selected by scheduling process of the base station transmits the high rate data after a predetermined number of frames of which power is adjusted by the base station. Accordingly, the power control (power increase) is performed before at least one frame from the frame for transmitting the high rate data, thereby decreasing frame errors by the terminal for the high rate data.

That is, the base station determines the level of increasing the target Eb/Nt, the level for increasing the power of the terminal, in accordance with the interference level by the scheduled terminal, the location of the terminal, the transmittable power and the state of a channel. The target Eb/Nt of the voice or low-speed data transmission terminal may increase by the scheduled packet data rate.

As mentioned above, the method for controlling the power according to the present invention has the following advantages.

When scheduling the high-speed data rate packet according to the packet data rate, it is possible to decrease the errors in the frame of the terminal for the voice or low-speed data transmission.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing power control in a communication system, the method comprising:
    adjusting a predetermined power control threshold value for a first mobile communication terminal for low rate data or voice data based on a communication environment condition of a second mobile communication terminal for higher rate data than a predetermined rate data, in case that the second mobile communication terminal is scheduled for a next frame; and
    transmitting a power control command to the first mobile communication terminal, the transmitted power control command being based on the adjusted-predetermined power control threshold value.

2. The method of claim 1, wherein the communication environment condition is at least one of an interference degree raised by the second mobile communication terminal, an available transmission power, or a condition of a reverse link.

3. The method of claim 1, wherein the power control threshold value is a ratio of a received signal power to a noise signal power.

4. The method of claim 1, wherein the first mobile communication terminal and the second mobile communication terminal are in a same service area served by a same base station.

5. The method of claim 1, wherein adjusting the predetermined power control threshold value is conducted at least one frame before the transmission of the second mobile communication terminal.

6. A method for performing power control in a communication system, the method comprising:
    adjusting a predetermined power control threshold value for a first mobile communication terminal according to a frame quality value of a received frame;
    re-adjusting the adjusted-predetermined power control threshold value for the first mobile communication terminal based on a communication environment condition of a second mobile communication terminal for higher rate data than a predetermined rate data, in case that the second mobile communication terminal is scheduled for a next frame; and
    transmitting a power control command to the first mobile communication terminal based on the re-adjusted-predetermined power control threshold value.

7. The method of claim 6, wherein the communication environment condition is at least one of an interference degree raised by the second mobile communication terminal, an available transmission power of the second mobile communication terminal, or a condition of a reverse link.

8. The method of claim 6, wherein the adjusted-predetermined power control threshold value varies according to a predetermined frame error rate.

9. The method of claim 6, wherein re-adjusting the predetermined power control threshold value is conducted at least one frame before the transmission of the second mobile communication terminal.

10. A method for performing power control in a communication system, the method comprising:
    comparing a group quality value of at least one power control group of a frame received from a first mobile communication terminal requiring a lower rate data than a predetermined rate data with a predetermined group quality value;
    transmitting a first power control command according to a result of the comparing;
    adjusting a predetermined power control threshold value according to a frame quality value of the received frame;
    re-adjusting the adjusted-predetermined power control threshold value based on a communication environment condition of a second mobile communication terminal requiring a higher rate data than the predetermined rate data, in case that the second mobile communication terminal is scheduled for a next frame; and
    transmitting a second power control command to the first mobile communication terminal based on the re-adjusted-predetermined power control threshold value.

11. The method of claim 10, wherein the communication environment condition is at least one of an interference degree raised by the second mobile communication terminal, an available transmission power, or a condition of a reverse link.

12. The method of claim 10, wherein the adjusted power control threshold value varies according to a predetermined frame error rate.

13. The method of claim 10, wherein the power control commands increase/decrease/maintain at a predetermined amount.

14. The method of claim 10, wherein re-adjusting the predetermined power control threshold value is conducted at least one frame before the second mobile communication terminal starts transmitting.

15. A mobile communication system, the system comprising:
a base station for generating a power control command based on a power control threshold value for a first mobile communication terminal, the power control command being adjusted according to a communication environment condition of a second mobile communication terminal requiring a higher rate date than a predetermined rate data in case that the second mobile communication terminal is scheduled for a next frame, the second mobile communication terminal being different than the first mobile communication terminal; and the first mobile communication terminal transmitting corresponding data based on the power control command to the base station after a predetermined time.

16. The system of claim 15, wherein the communication environment condition is at least one of an interference degree raised by the second mobile communication terminal, an available transmission power, or a condition of a reverse link.

17. A method for performing power control in a communication system, the method comprising:
transmitting power control information to a first mobile communication terminal by using a terminal power control threshold of the first mobile communication terminal, the terminal power control threshold having been changed based on a communication environment of a second mobile communication terminal for requiring high-speed data transmission, in case that the second mobile communication terminal is scheduled for a next frame.

18. The method of claim 17, wherein the terminal power control threshold is changed after receiving at least one frame, based on the communication environment of the second mobile communication terminal.

19. The method of claim 17, wherein the communication environment is determined by an interference signal level of the second mobile communication terminal, a location, a transmittable power, and a channel state of a reverse link.

20. The method of claim 17, wherein the first mobile communication terminal and the second mobile communication terminal are in a same service area served by a same base station.

* * * * *